(12) United States Patent
Thomas et al.

(10) Patent No.: US 7,578,535 B2
(45) Date of Patent: Aug. 25, 2009

(54) HEADREST SYSTEM FOR AN AUTOMOTIVE VEHICLE

(75) Inventors: Freeman Thomas, Laguna Beach, CA (US); Kris Tomasson, Corona del Mar, CA (US); David Woodhouse, Newport Coast, CA (US); Brian White, Rancho Santa Margarita, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 335 days.

(21) Appl. No.: 11/620,191

(22) Filed: Jan. 5, 2007

(65) Prior Publication Data

US 2008/0164710 A1 Jul. 10, 2008

(51) Int. Cl.
*B60R 21/00* (2006.01)
*A47C 1/10* (2006.01)

(52) U.S. Cl. ......................................... 296/63; 297/395

(58) Field of Classification Search ................ 296/63; 297/395
See application file for complete search history.

(56) References Cited

U.S. PATENT DOCUMENTS 3,310,342 A * 3/1967 Drelichowski .............. 297/395
3,964,788 A * 6/1976 Kmetyko .................... 297/395

* cited by examiner

*Primary Examiner*—Joseph D Pape
(74) *Attorney, Agent, or Firm*—Frank MacKenzie; Brooks Kushman P.C.

(57) ABSTRACT

A headrest system for an automotive vehicle having a seat and a roof includes a headrest to limit the movement of a head of an occupant seated in the seat, a bracket to support the headrest and being attached with the headrest, and a track including a bracket receiving portion configured to receive a portion of the bracket. The track is attached with the roof of the vehicle. The headrest is not attached to the seat. The bracket includes an adjustable feature to permit the headrest to adjust relative to the track.

12 Claims, 4 Drawing Sheets

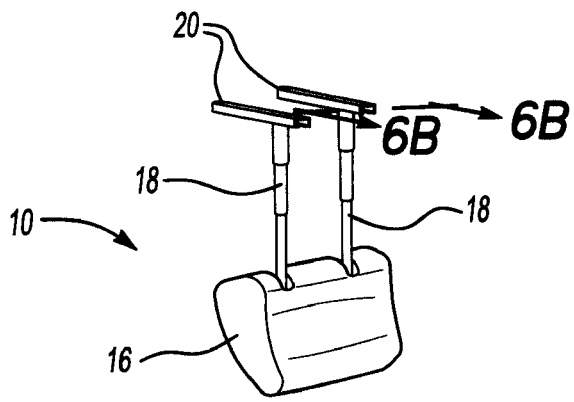
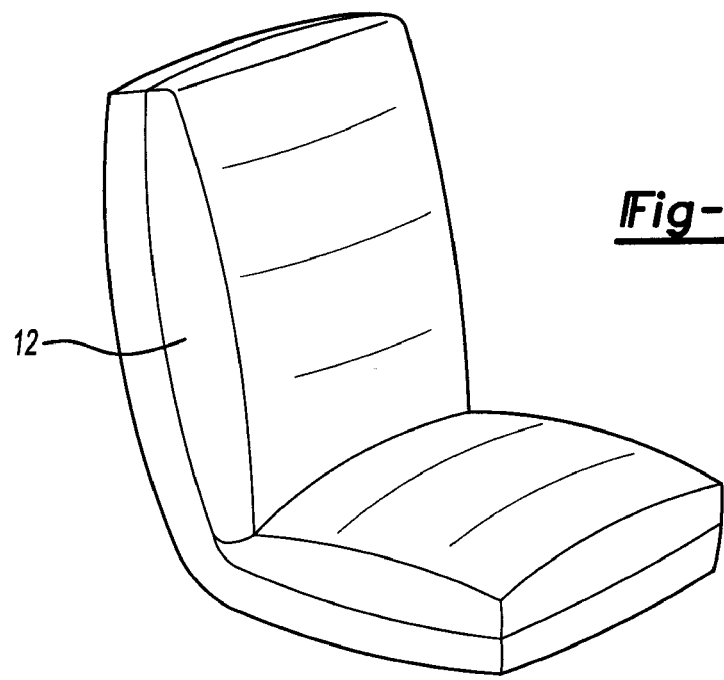
Fig-1
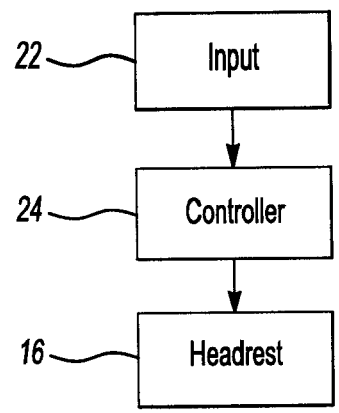
Fig-2

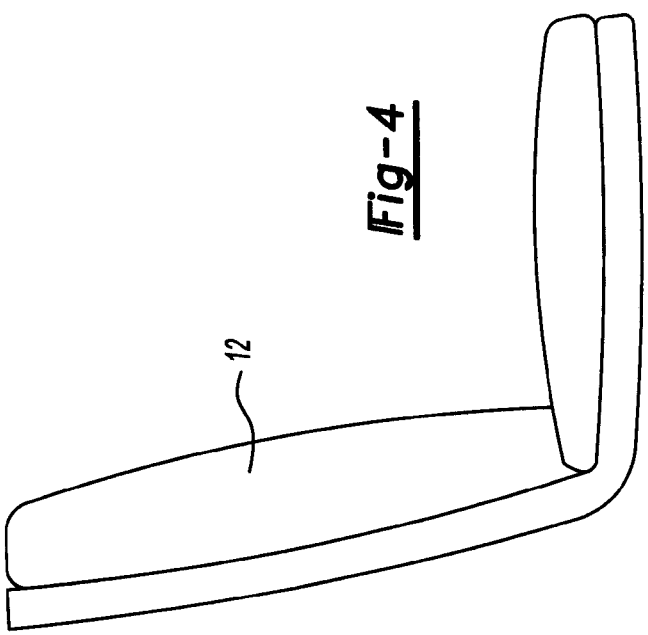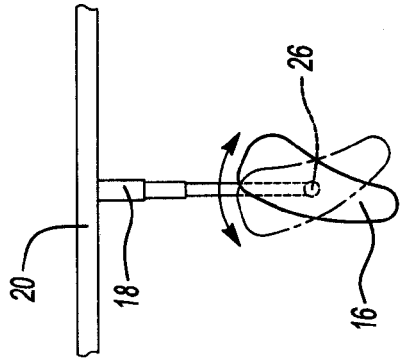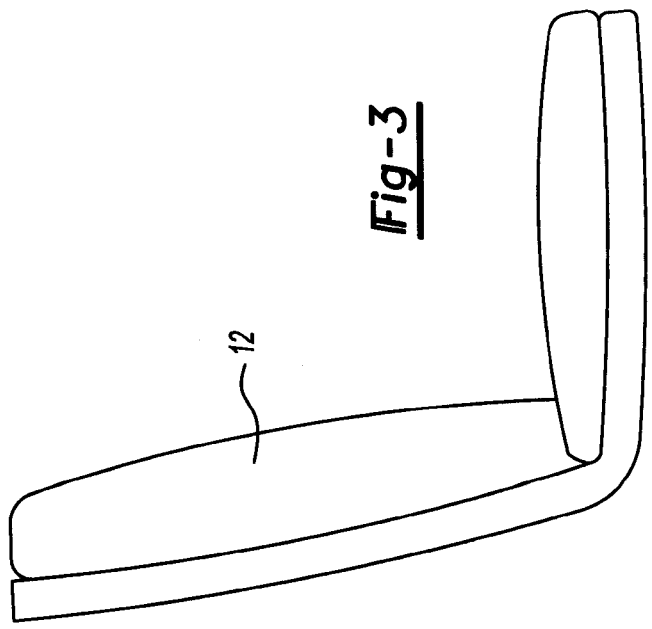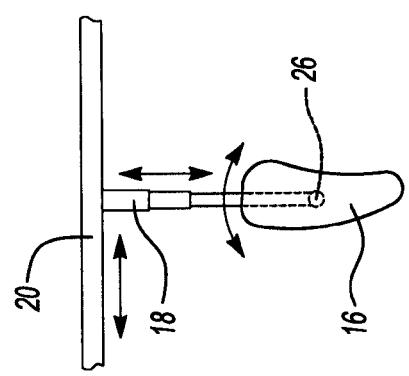

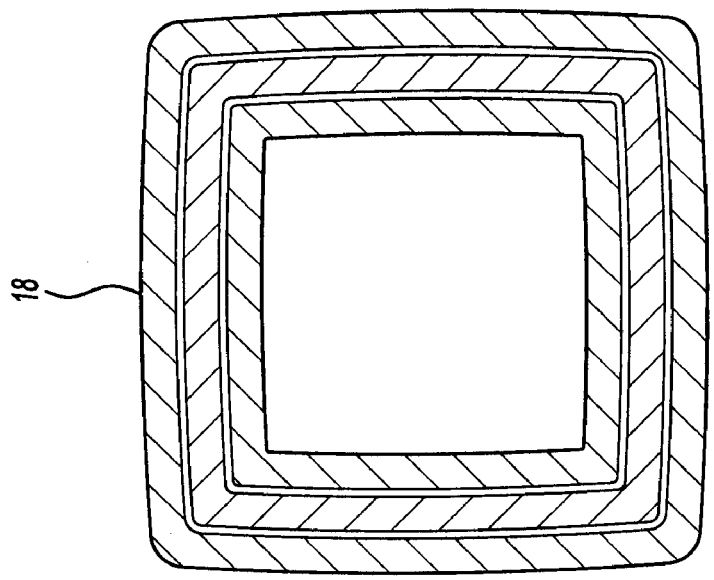
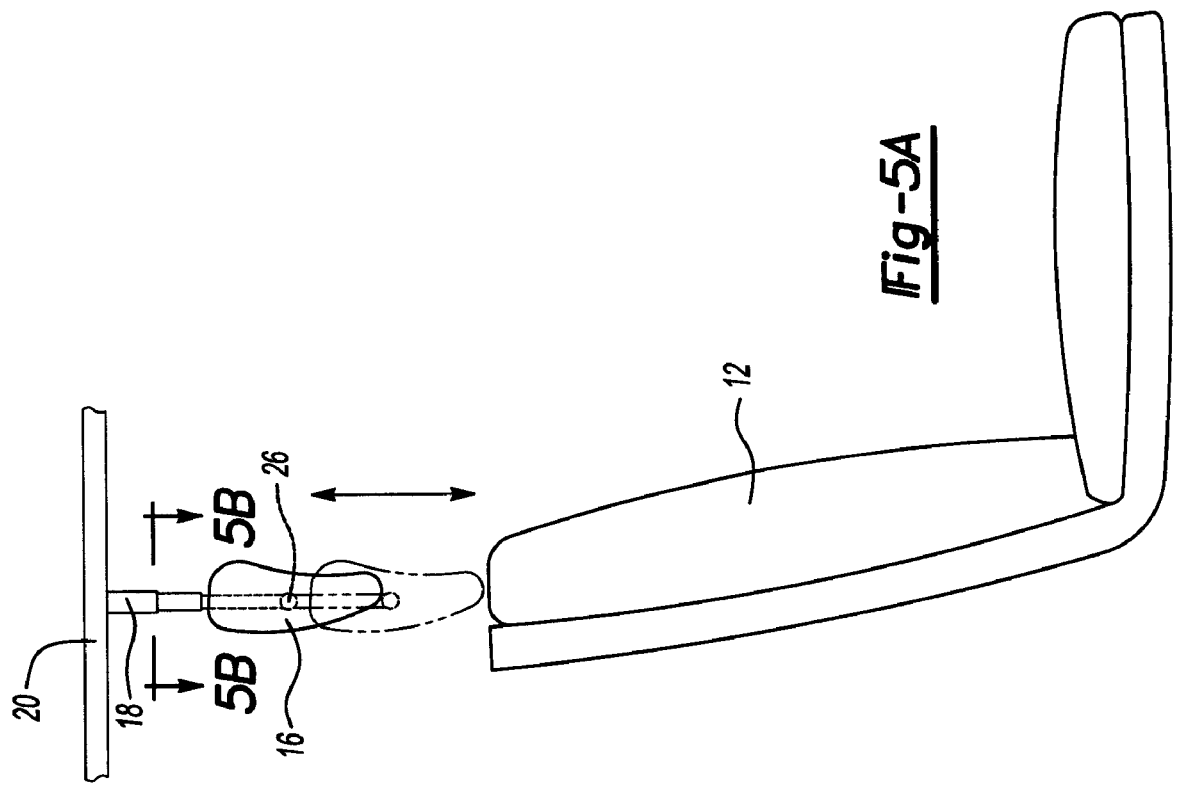

HEADREST SYSTEM FOR AN AUTOMOTIVE VEHICLE

BACKGROUND OF THE INVENTION

1. Field of the Invention

The invention relates to headrest systems for automotive vehicles.

2. Discussion

A vehicle seat may include a headrest attached with the seat. The headrest may limit the movement of an occupant's head during certain vehicle maneuvers or during an impact event.

Different occupants may position the headrest differently because of the different shapes and sizes of the occupants.

Vehicle seats may be retracted, collapsed, or otherwise folded to increase the cabin space within the vehicle. The spaces configured to receive the retracted, collapsed, or otherwise folded seats may accommodate the headrest.

SUMMARY

Embodiments of the invention may take the form of a headrest system for an automotive vehicle having a seat. The headrest system includes a headrest to limit the movement of a head of an occupant seated in the seat and a bracket to support the headrest. The bracket is attached with the headrest and a portion of the vehicle other than the seat. The headrest is not attached to the seat.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a side perspective view of a headrest system in accordance with an embodiment of the invention.

FIG. 2 is a block diagram of a control system for moving the headrest of FIG. 1 in accordance with an embodiment of the invention.

FIG. 3 is a side elevation view of the headrest system of FIG. 1 and shows the directions in which the headrest may move relative to the track.

FIG. 4 is another side elevation view of the headrest system of FIG. 1 and shows the headrest rotating.

FIG. 5A is yet another side elevation view of the headrest system of FIG. 1 and shows the headrest moving up and down.

FIG. 5B is an end view, in cross-section, of a portion of the brackets taken along section line 5B-5B of FIG. 5A and shows several squircular sections of decreasing width that form the brackets telescoping feature.

DETAILED DESCRIPTION

Figure 6B:
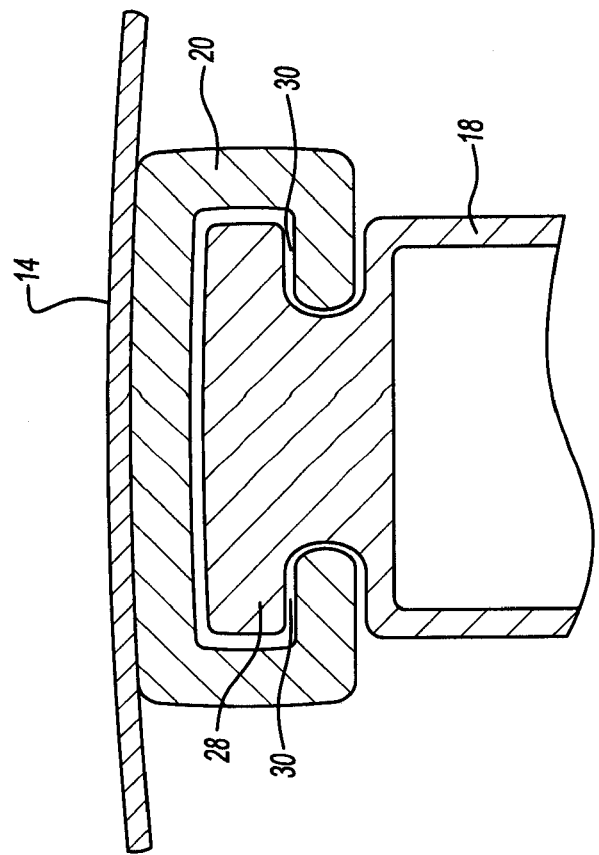
FIG. 6B is an end view, in cross-section, of a portion of the brackets and tracks taken along section line 6B-6B of FIG. 1 and shows the interface between the brackets and tracks.

FIG. 1 is a side perspective view of headrest system 10 and seat 12 of vehicle 14. Headrest system 10 includes headrest 16, brackets 18, and tracks 20. Headrest 16 limits the movement of an occupant's head during, for example, impact. Headrest 16 is not connected with seat 12. Rather, in the embodiment of FIG. 1, headrest 16 is connected with vehicle 14 via brackets 18 and tracks 20. Brackets 18 provide structural support for headrest 16 and are mechanically connected with tracks 20 as will be described below.

FIG. 2 is a block diagram showing a control system for moving headrest 16. The control system includes input 22 and controller 24. In some embodiments, input 22 may comprise buttons, located within seat 12, operatively connected with controller 24 such that actuating the buttons will move headrest 16 in a desired fashion. In other embodiments, input 22 may comprise switches, located on a dashboard (not shown) or steering wheel (not shown) of vehicle 14, operatively connected with controller 24 such that actuating the switches will move headrest 16 in a desired fashion.

Controller 24, e.g., processor and associated motors, is configured, in conventional fashion, to receive input via, for example, a car area network, from buttons 22 and in response, move headrest 16. Headrest 16 may move in a number of different ways as described below. Such movement may permit headrest system 10 to accommodate occupants of differing shapes and sizes in a way that a head rest attached with seat 12 may not. Such movement may also permit headrest 16 to retract and rotate away from seat 12 to increase the amount of unobstructed cabin space within vehicle 14.

In some embodiments, and in the absence of the control system as described above, an occupant may manually adjust or move headrest 16.

FIG. 3 is a side elevation view of headrest system 10 and seat 12 and shows, by arrow, the directions in which headrest 16 may move relative to track 20. As shown, headrest 16 may move up and down, fore and aft, and rotate.

FIG. 4 is another side elevation view of headrest system 10 and seat 12. Headrest 16 may rotate about conventional pivot bar 26 in the directions indicated by arrow. In the embodiment of FIG. 4, pivot bar 26 spans between brackets 18 and is mechanically fixed, e.g., riveted, with headrest 16. Brackets 18 each include an opening configured to receive an end of pivot bar 26 such that pivot bar 26 may rotate relative to brackets 18. Alternatively, headrest 16 may be configured to rotate in any desired fashion.

FIG. 5A is yet another side elevation view of headrest system 10 and seat 12. Headrest 16 may move up and down in the directions indicated by arrow. In the embodiment of FIG. 5A, brackets 18 include a telescoping feature, e.g., several sections of decreasing diameter or width as shown in FIG. 5B, that allows it to adjust its length. If headrest system 16 moves up, the sections of brackets 18 having a smaller width collapse into the sections having a larger width. If headrest system 16 moves down, the sections of brackets 18 having a smaller width extend out from the sections having a larger width.

In the embodiments of FIGS. 5A and 5B, the sections are squircular, e.g., a squared circle, in cross-section. This squircular configuration limits the degree to which the sections may rotate relative to each other. In other embodiments, however, the sections may have any desired shape.

Figure 6A:
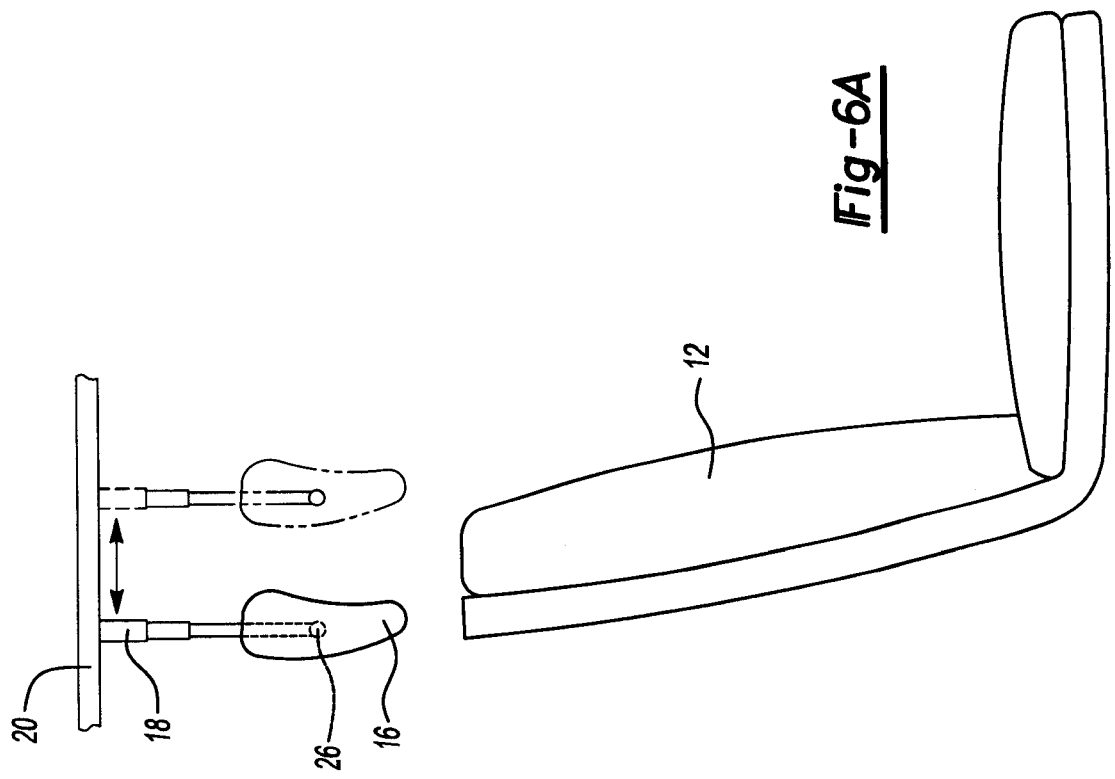
FIG. 6A is still yet another side elevation view of the headrest system of FIG. 1 and shows the headrest moving fore and aft.

FIG. 6A is still yet another side elevation view of headrest system 10 and seat 12. Headrest 16 may move fore and aft along tracks 20 in the directions indicated by arrow.

FIG. 6B is an end view, in cross-section, of a portion of bracket 18 and track 20 taken along section line 6B-6B of FIG. 1 showing the interface between bracket 18 and track 20. In the embodiment of FIG. 6B, bracket 20 is formed as a C-shaped channel. Bracket 18 includes male portion 28 which is configured to be received by C-shaped channel 20. Bearings or other conventional elements that would facilitate ease of movement between male portion 28 and C-shaped channel 20 may be included in gap portion 30. If headrest 16 moves fore or aft, male portion 28 of bracket 18 slides within C-shaped channel 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A headrest system for an automotive vehicle having a seat and a roof, the system comprising:
    a headrest to limit the movement of a head of an occupant seated in the seat;
    a bracket to support the headrest and being attached with the headrest; and
    a track including a bracket receiving portion configured to receive a portion of the bracket, wherein the track is attached with the roof of the vehicle, wherein the headrest is not attached to the seat, wherein the bracket includes an adjustable feature to permit the headrest to adjust relative to the track, and wherein the adjustable feature comprises a telescoping feature to permit the headrest to move relative to the track.

2. The system of claim 1 further comprising a controller arrangement configured to receive a control command and adjust the headrest relative to the track in response to the control command.

3. The system of claim 1 wherein at least a portion of the adjustable feature is squircular in cross-section to limit the rotation of the telescoping feature.

4. The system of claim 1 wherein the adjustable feature further comprises an articulating joint to permit the headrest to rotate relative to the track.

5. The system of claim 1 wherein the track is configured to permit the bracket to move along the track.

6. The system of claim 5 further comprising a controller arrangement configured to receive a control command and move the bracket along the track in response to the control command.

7. A headrest system for an automotive vehicle having a seat and a roof, the system comprising:
    a headrest to limit the movement of a head of an occupant seated in the seat;
    a bracket to support the headrest and being attached with the headrest; and
    a track including a bracket receiving portion configured to receive a portion of the bracket, wherein the track is attached with the roof of the vehicle, wherein the headrest is not attached to the seat, wherein the bracket includes an adjustable feature to permit the headrest to adjust relative to the track, and wherein the adjustable feature comprises an articulating joint to permit the headrest to rotate relative to the track.

8. The system of claim 7 further comprising a controller arrangement configured to receive a control command and adjust the headrest relative to the track in response to the control command.

9. The system of claim 7 wherein at least a portion of the adjustable feature is squircular in cross-section to limit the rotation of the telescoping feature.

10. The system of claim 7 wherein the adjustable feature further comprises a telescoping feature to permit the headrest to move relative to the track.

11. The system of claim 7 wherein the track is configured to permit the bracket to move along the track.

12. The system of claim 7 further comprising a controller arrangement configured to receive a control command and move the bracket along the track in response to the control command.

* * * * *